United States Patent
Botosan et al.

(10) Patent No.: US 6,767,304 B1
(45) Date of Patent: Jul. 27, 2004

(54) CONTROL SYSTEM FOR AN EIGHT-SPEED AUTOMATIC TRANSMISSION

(75) Inventors: Valentin Botosan, Rochester, MI (US); Berthold Martin, Shelby Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/437,314

(22) Filed: May 13, 2003

(51) Int. Cl.[7] .............................................. F16H 31/00
(52) U.S. Cl. ..................................................... 475/132
(58) Field of Search ................................. 475/132, 123

(56) References Cited

U.S. PATENT DOCUMENTS

| | | |
|---|---|---|
| 5,458,545 A | 10/1995 | Adam et al. |
| 6,120,406 A * | 9/2000 | Redlinger et al. .......... 475/132 |
| 6,159,124 A | 12/2000 | Redinger et al. |
| 6,299,565 B1 | 10/2001 | Jain et al. |
| 6,422,969 B1 | 7/2002 | Raghavan et al. |

* cited by examiner

*Primary Examiner*—Dirk Wright
(74) *Attorney, Agent, or Firm*—Edwin W. Bacon, Jr.

(57) ABSTRACT

An eight-speed automatic transmission having a compound planetary gear set, a second planetary gear set, and a third planetary gear set each driven by three clutches and fixed to four brakes. A hydraulic control system actuates the eight-speed transmission by selectively energizing a plurality of solenoids that in turn engage the three clutches and four brakes. The hydraulic control system provides electronically modulated converter clutch control to the eight-speed automatic transmission system when the hydraulic system is in a drive position, a manual/low position, and a park/neutral position.

4 Claims, 6 Drawing Sheets

FIG 2

8-SPEED AUTOMATIC TRANSMISSION

| GEAR SELECTION | CLUTCHES APPLIED | SOLENOIDS ENERGIZED |
|---|---|---|
| 1ST | C1 & B1 | CC & MS |
| 2ND | C1 & B2 | B2 & MS |
| 3RD | C1 & B3 | B3 & MS |
| 4TH | C1 & B4 | B4 & MS |
| 5TH | C1 & C2 | C2 & MS |
| 6TH | C2 & B4 | B4 & C1 |
| 7TH | C2 & B3 | B3 & C1 |
| 8TH | C2 & B2 | B2 & C1 |
| REVERSE | C3 & B1 | -- |
| REVERSE (SPEED >8 MPH) | C3 | MS |
| PARK/NEUTRAL | B1 | CC & MS |
| NEUTRAL (SPEED >8 MPH) | -- | MS |
| PARK/NEUTRAL WITH EMCC | B1 | -- |

KEY

C1 – FIRST CLUTCH
C2 – SECOND CLUTCH
C3 – THIRD CLUTCH
B1 – FIRST BRAKE
B2 – SECOND BRAKE
B3 – THIRD BRAKE
B4 – FOURTH BRAKE
MS – MULTISELECT SOLENOID
CC – CONVERTER CLUTCH SOLENOID
MS & C1 – NORMALLY OPEN
C2, C3, B2, B3, B4 – NORMALLY CLOSED

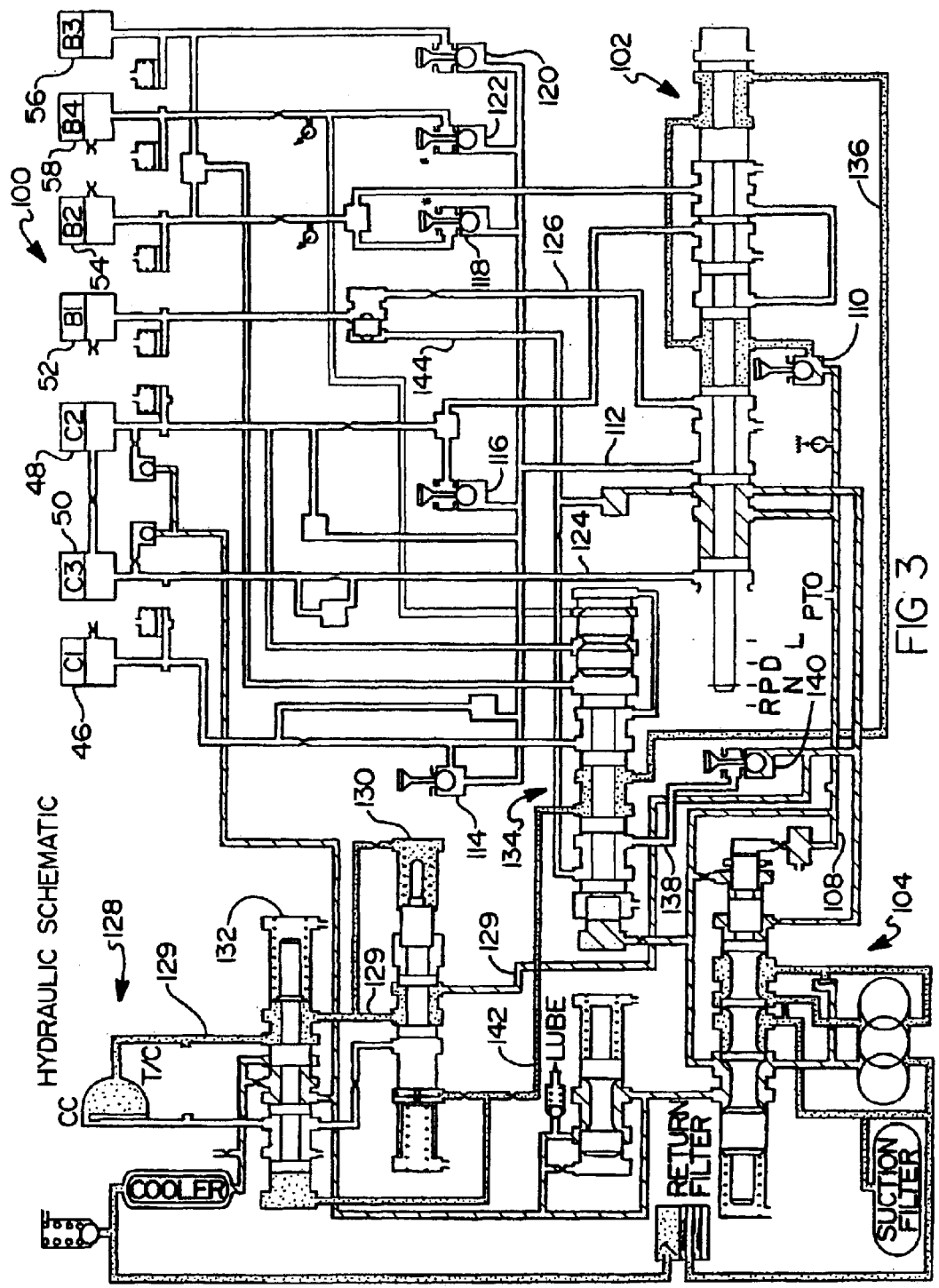

CONTROL SYSTEM FOR AN EIGHT-SPEED AUTOMATIC TRANSMISSION

FIELD OF THE INVENTION

The present invention relates to automatic transmissions, and more particularly to a control system for an eight-speed automatic transmission.

BACKGROUND OF THE INVENTION

A typical automatic transmission in a motor vehicle has two or three planetary gear sets, one of which receives a torque input from an engine, another one of which is coupled to a drive shaft for providing a torque output. During operation, a set of frictional units couple the torque input from the engine to one or more members of the planetary gear sets. Simultaneously, another set of frictional units holds stationary one or more members of the planetary gear sets. These frictional units provide different ratios of input-to-output torque to the vehicle.

Automatic transmissions are typically controlled by a hydraulic control system. These hydraulic control systems are used to engage and disengage the frictional units of the transmission according to the ratio of torque needed. A typical hydraulic control system is disclosed in U.S. Pat. No. 6,159,124 to Redinger et al., herein incorporated by reference. The typical hydraulic control system is composed of various valves that direct and regulate hydraulic pressure to the frictional units via various fluid passages.

A typical automatic transmission has four gear speeds with at most seven frictional units providing four forward torque ratios and a reverse. Transmissions achieving more torque ratios have been burdened by the need for additional valves to operate more frictional units. These valves are expensive and can decrease the reliability of the transmission. Therefore, it is an object of the present invention to provide an eight-speed automatic transmission providing eight forward torque ratios that requires few additional valves in the hydraulic control system as compared to existing four speed automatic transmissions. It is a further object of the present invention to provide this transmission with an electronically modulated converter clutch when the transmission is in a park/neutral position for proper operation of an auxiliary Power Take-Off Unit (PTO) mounted to and driven by the transmission.

SUMMARY OF THE INVENTION

The eight-speed automatic transmission of the present invention is controlled by a hydraulic control system. The hydraulic control system has a pressurized fluid source and a manual valve selectively movable to a reverse, drive, manual/low, and park/neutral positions. The manual valve communicates with the pressurized fluid source by a first fluid passage having a multiselect solenoid. A second fluid passage communicates with the clutches, brakes, and manual valve, and has a plurality of pulse-width solenoids disposed between the clutches and the manual valve and between the brakes and the manual valve.

The hydraulic control system has a torque converter in fluid communication with the pressurized fluid source through a third fluid passage. The torque converter is electronically modulated that is activated when a torque converter pressure valve opens the third fluid passage to the torque converter. A fourth fluid passage communicates with a switching valve and with the manual valve. A fifth fluid passage communicates with the switching valve and the pressurized fluid source and has a converter clutch solenoid disposed between the switching valve and the pressurized fluid source. A sixth fluid passage communicates from the switching valve to the torque control pressure control valve.

When the manual valve is in the park/neutral position and the multiselect solenoid is in an open position, fluid from the pressurized fluid source flows through the first fluid passage to the manual valve, through the manual valve, through the fourth fluid passage to the switching valve, and through the sixth fluid passage to the torque converter pressure valve, thereby opening the third fluid passage to the torque converter and activating the electronically modulated converter clutch.

When the manual valve is in the drive and manual/low positions, fluid from the pressurized fluid source flows through the first fluid passage to the manual valve, through the fifth fluid passage to the switching valve when the converter clutch solenoid is in an open position, through the switching valve, through the sixth fluid passage to the torque converter pressure valve, thereby opening the third fluid passage to the torque converter and activating the electronically modulated converter clutch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a table showing the solenoids to be energized to provide the combination of clutches and brakes that achieve specific torque ratios according to the principles of the present invention;

FIG. 3 is a schematic view of a hydraulic control system for an eight-speed automatic transmission in the park/neutral position according to the principles of the present invention;

DETAILED DESCRIPTION OF THE PREFERRED EMBODIMENTS

The following description of the preferred embodiment is merely exemplary in nature and is in no way intended to limit the invention, its application, or uses.

Figure 1:
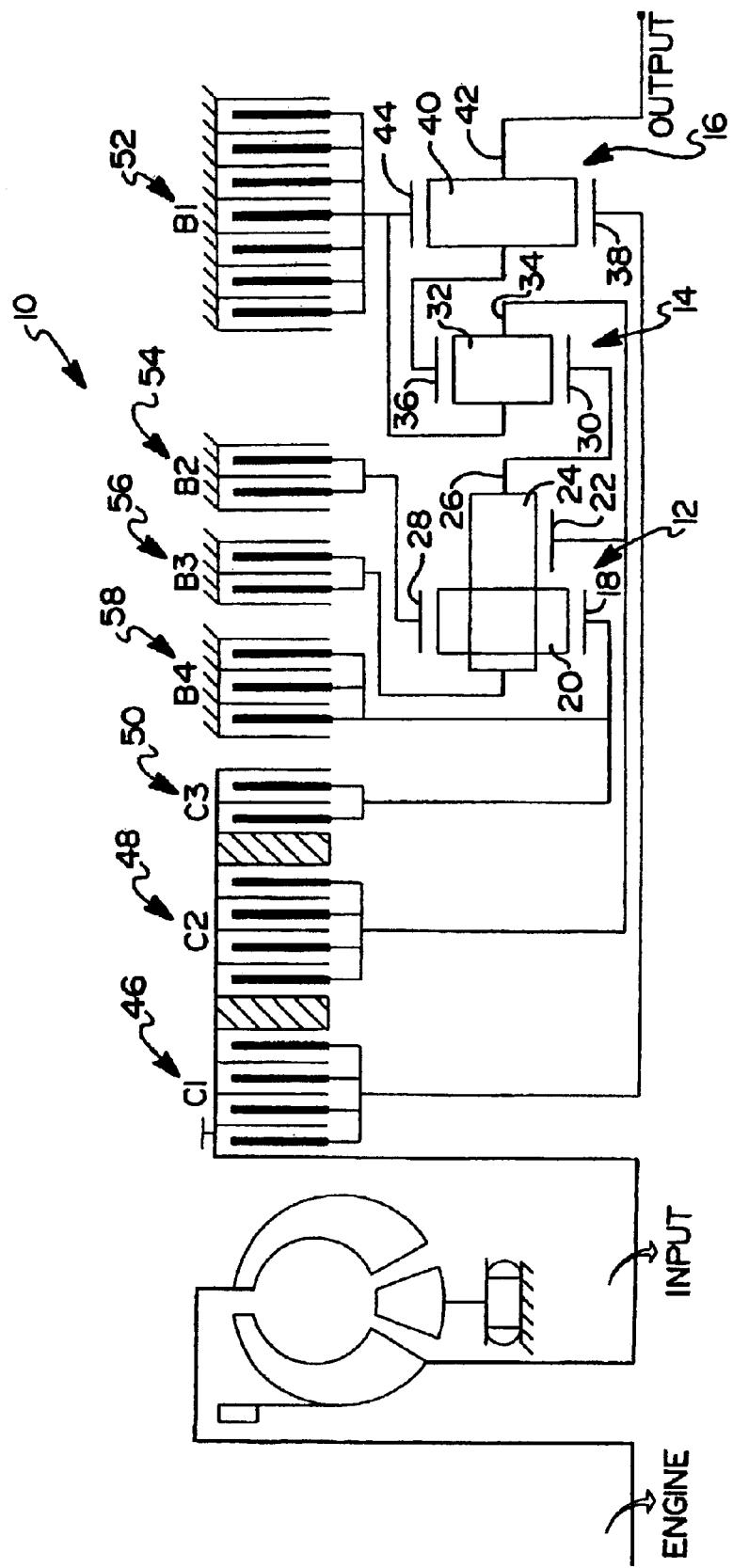
FIG. 1 is a schematic diagram of an eight-speed automatic transmission according to the principles of the present invention.

Referring now to FIG. 1, a schematic diagram of an eight-speed automatic transmission 10 for use in a vehicle is provided. The eight-speed automatic transmission 10 comprises a compound planetary gear set 12, a second planetary gear set 14, and a third planetary gear set 16. In the preferred embodiment, the compound planetary gear set 12 is a Ravigneaux Planetary Gear Set as is well known in the art. The compound planetary gear set 12 includes a small sun gear 18 engaged with a plurality of first pinions 20 (one of which is shown), and a large sun gear 22 engaged with a plurality of second pinions 24 (one of which is shown). The first and second pinions 20, 24 are rotatably supported on a carrier 26 and the plurality of first pinions 20 are engaged with a ring gear 28.

The second planetary gear set 14 includes a second sun gear 30 engaged with a plurality of pinions 32 (one of which is shown). The plurality of pinions 32 are rotatably supported on a second carrier 34 and engaged with a second ring gear 36. The second sun gear 30 is drivingly engaged with the carrier 26 of the compound gear set 12.

The third planetary gear set 16 includes a third sun gear 38 engaged with a plurality of pinions 40. The plurality of pinions 40 are rotatably supported on a third carrier 42 and engaged with a third ring gear 44. The third carrier 42 is drivingly engaged with the second ring gear 36 of the second planetary gear set 14. The third ring gear 44 is drivingly engaged with the second carrier 34 of the second planetary gear set 14. The third carrier 42 rotates to produce a torque output.

The eight-speed automatic transmission 10 further includes a first clutch 46, a second clutch 48, and a third clutch 50. Clutches 46, 48, 50 each are selectively engagable to receive a torque input from an engine. The first clutch 46 is drivingly connected to the third sun gear 38 of the third planetary gear set 16. The second clutch 48 is drivingly connected to the large sun gear 22 of the compound planetary gear set 12 as well as to the second carrier 34 of the second planetary gear set 14. The third clutch 50 is drivingly connected to the small sun gear 18 of the compound planetary gear set 12.

The eight-speed automatic transmission 10 further includes a first brake 52, a second brake 54, a third brake 56, and a fourth brake 58. The first brake 52 is drivingly connected to the third ring gear 44 of the third planetary gear set 16 as well as to the second carrier 34 of the second planetary gear set 14. The second brake 54 is drivingly connected to the ring gear 28 of the compound planetary gear set 12. The third brake 56 is drivingly connected to the carrier 26 of the compound planetary gear set 12. The fourth brake 58 is drivingly connected to the small sun gear 18 of the compound planetary gear set 12. Each of the brakes 52, 54, 56, 58 is selectively fixable such that the brakes 52, 54, 56, 58 prevent rotation of any attached gear and/or carrier.

During operation of the eight-speed automatic transmission 10, the torque input from the engine is transferred through one of the clutches 46, 48, 50 to the planetary gear sets 12, 14, 16 and on to the third carrier 42 providing the torque output. To achieve specific torque input-to-output ratios, one or more of the clutches 46, 48, 50 and brakes 52, 54, 56, 58 are engaged to receive torque input from the engine and/or to prevent rotation of attached gears and/or carriers. There is shown in FIG. 2 a table illustrating the combination of clutches and brakes engagable to achieve specific torque input-to-output ratios. Each clutch and brake combination corresponds to one of eight forward gear speeds, two reverse speeds, and two neutral speeds, each of which correspond to a torque input-to-output ratio.

With reference to FIG. 3, a hydraulic control system 100 for actuating the eight-speed automatic transmission 10 is provided. The hydraulic control system 100 includes a manual valve 102 in fluid communication with the first clutch 46, the second clutch 48, the third clutch 50, the first brake 52, the second brake 54, the third brake 56, and the fourth brake 58. The manual valve 102 has a reverse position "R", a park/neutral position "P", "N", a drive position "D", and a manual/low position "L". Each one of the positions allows specific fluid flow through the manual valve 102 to various fluid passages and on to the various clutches 46, 48, 50 and brakes 52, 54, 56, 58.

Specifically, the manual valve 102 receives a pressurized fluid from a pressurized fluid source 104 through a first fluid passage 108. A Power Take-Off Unit (PTO) is hydraulically connected to the pressurized fluid source 104 by the first fluid passage 108. A multiselect pulse-width solenoid valve 110 disposed along the first fluid passage 108 is in an open position when in a de-energized state and selectively allows fluid communication between the pressurized fluid source 104 and the manual valve 102.

A second fluid passage 112 communicates fluid from the manual valve 102 to the first clutch 46, the second clutch 48, the second brake 54, the third brake 56, and the fourth brake 58. A first clutch solenoid valve 114 disposed along the second fluid passage 112 is in an open position when in a de-energized state and selectively allows fluid communication between the manual valve 102 and the first clutch 46. A second clutch solenoid valve 116 disposed along the second fluid passage 112 is in a closed position when in a de-energized state and selectively allows fluid communication between the manual valve 102 and the second clutch 48. A second brake solenoid valve 118 disposed along the second fluid passage 112 is in a closed position when in a de-energized state and selectively allows fluid communication between the manual valve 102 and the second brake 54. A third brake solenoid valve 120 disposed along the second fluid passage 112 is in a closed position when in a de-energized state and selectively allows fluid communication between the manual valve 102 and the third brake 56. A fourth brake solenoid valve 122 disposed along the second fluid passage 112 is in a closed position when in a de-energized state and selectively allows fluid communication between the manual valve 102 and the fourth brake 58.

The third clutch 50 is in direct communication with the manual valve 102 by a fluid passage 124. The first brake 52 is also in direct communication with the manual valve 102 by a fluid passage 126.

The hydraulic control system 100 further includes a torque converter 128 having an electronically modulated converter clutch (hereinafter EMCC). The EMCC modulates the pressure within the torque converter 128, providing increased fuel efficiency when the manual valve 102 is in the drive position. When the manual valve 102 is in a park/neutral position, EMCC also allows the engine to provide direct power to the separate PTO having a conventional design. The torque converter 128 is in fluid communication with the pressurized fluid source 104 through a third fluid passage 129 which may be selectively closed off by a torque converter pressure valve 130 and a converter switching valve 132. The EMCC within the torque converter 128 is activated when pressurized fluid from the pressurized fluid source 104 flows through the third fluid passage 129, through the torque converter pressure valve 130 and the converter switching valve 132 to the torque converter 128.

A switching valve 134 is disposed between the torque converter 128 and the manual valve 102. The switching valve 134 communicates with the manual valve 102 through a fourth fluid passage 136, and communicates with the pressurized fluid source 104 through a fifth fluid passage 138. A converter clutch solenoid valve 140 disposed along the fifth fluid passage 138 is in a closed position when in a de-energized state and selectively allows fluid communication between the pressurized fluid source 104 and the switching valve 134. The switching valve 134 is in fluid communication with the torque converter pressure valve 130 and the converter switching valve 132 by a sixth fluid passage 142. The switching valve 134 is also in fluid communication with the first brake 52 by a seventh fluid passage 144.

When the manual valve 102 is in the park/neutral position, fluid flows from the pressurized fluid source 104 through the first fluid passage 108 and into the manual valve 102 when the multiselect solenoid valve 110 is de-energized in its open position. The fluid flows through the manual valve 102, through the fourth fluid passage 136 into the switching valve 134, through the switching valve 134, and through the sixth fluid passage 142 to the torque converter pressure valve 130 and the converter switching valve 132. This fluid forces the torque converter pressure valve 130 and the converter switching valve 132 to open the third fluid passage 129 to the torque converter 128, thereby activating EMCC.

Figure 4:
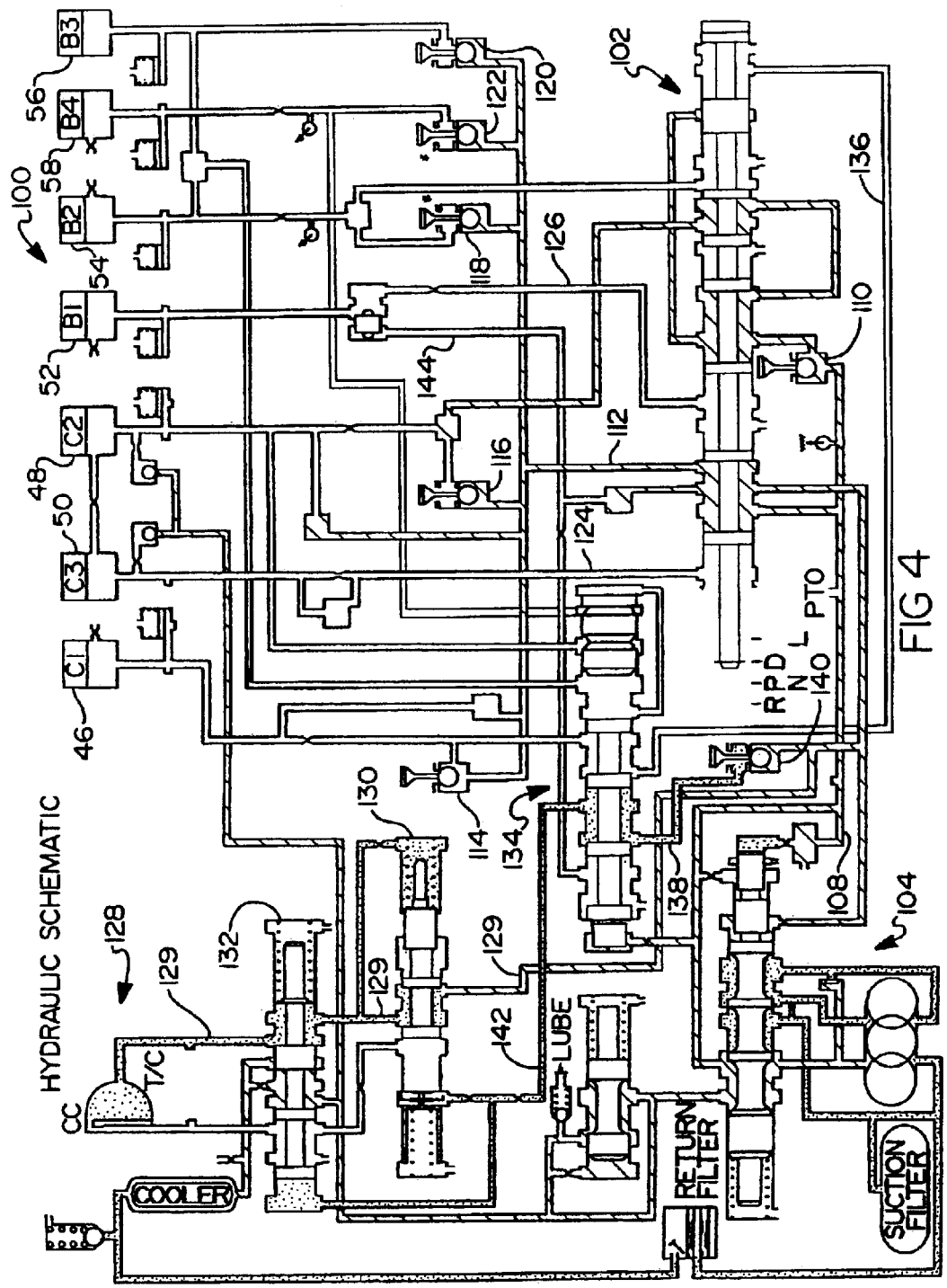
FIG. 4 is a schematic view of a hydraulic control system for an eight-speed automatic transmission in the drive position according to the principles of the present invention.
Figure 5:
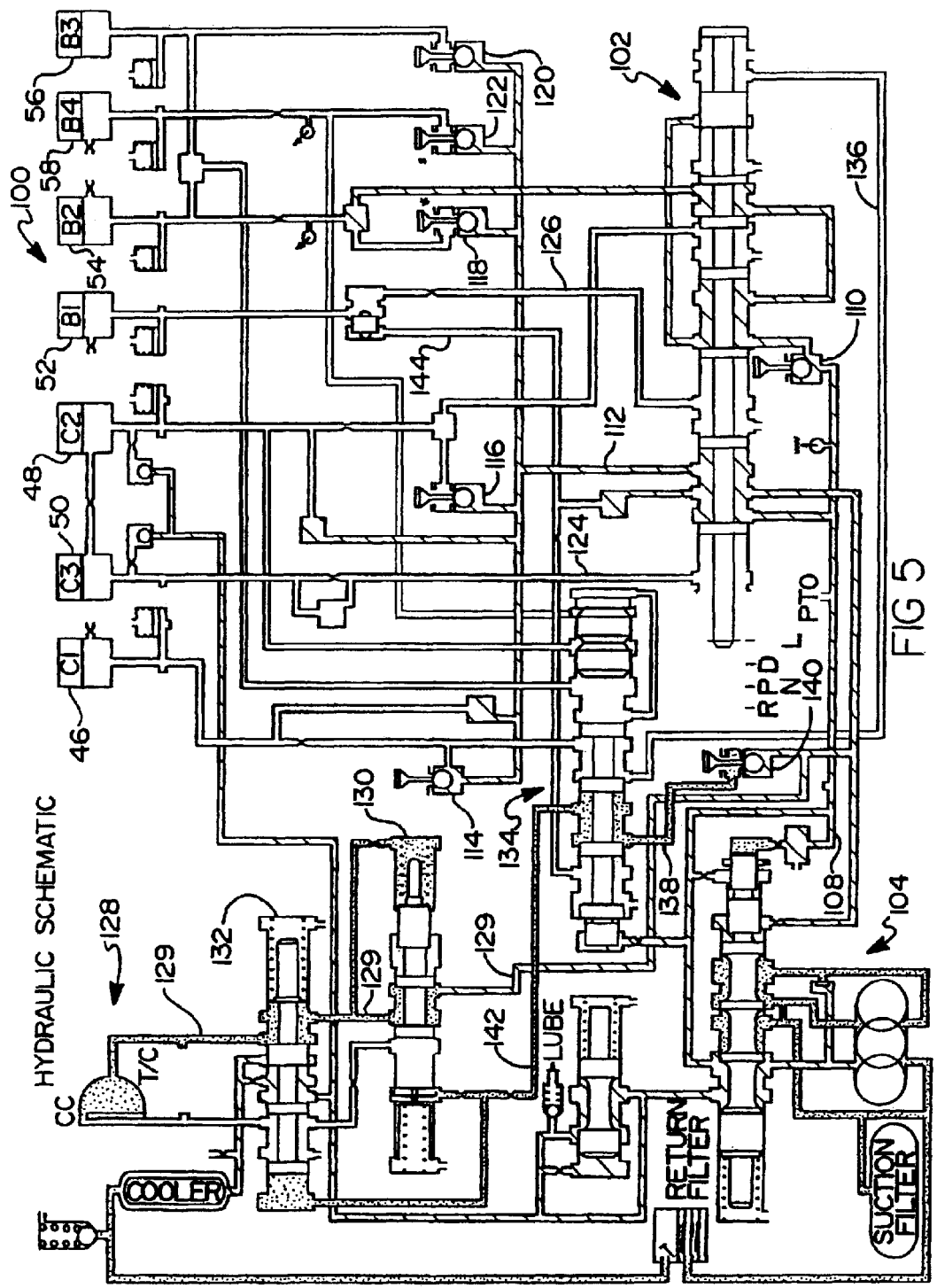
FIG. 5 is a schematic view of a hydraulic control system for an eight-speed automatic transmission in the manual/low position according to the principles of the present invention.

Referring now to FIGS. 4 and 5, when the manual valve 102 is in the drive and manual/low positions, fluid flows from the pressurized fluid source 104 through the first fluid passage 108 to the manual valve 102, through the manual valve 102 to the second fluid passage 112 where solenoid valves 114, 116, 118, 120, and 122 allow for fluid communication to and consequent engagement of the first clutch 46, the second clutch 48, the second brake 54, the third brake 56, and the fourth brake 58. The drive and manual/low positions of the manual valve 102 prevent fluid from communicating through fluid passage 124 to the third clutch 50, and prevent fluid from communicating through fluid passage 126 to the first brake 52. As shown in FIG. 2, various gear speeds may be obtained by energizing specific solenoids thereby engaging the clutches 46, 48 and the brakes 54, 56, 58.

To activate the EMCC when the manual valve 102 is in the drive and manual/low positions, the converter clutch solenoid valve 140 is energized to an open position. Fluid then flows from the pressurized fluid source 104 through the fifth fluid passage 138 into the switching valve 134, through the switching valve 134, and then through the sixth fluid passage 142 to the torque converter pressure valve 130 and the converter switching valve 132. This fluid forces the torque converter pressure valve 130 and the converter switching valve 132 to open the third fluid passage 129 to the torque converter, thereby activating EMCC.

Figure 6:
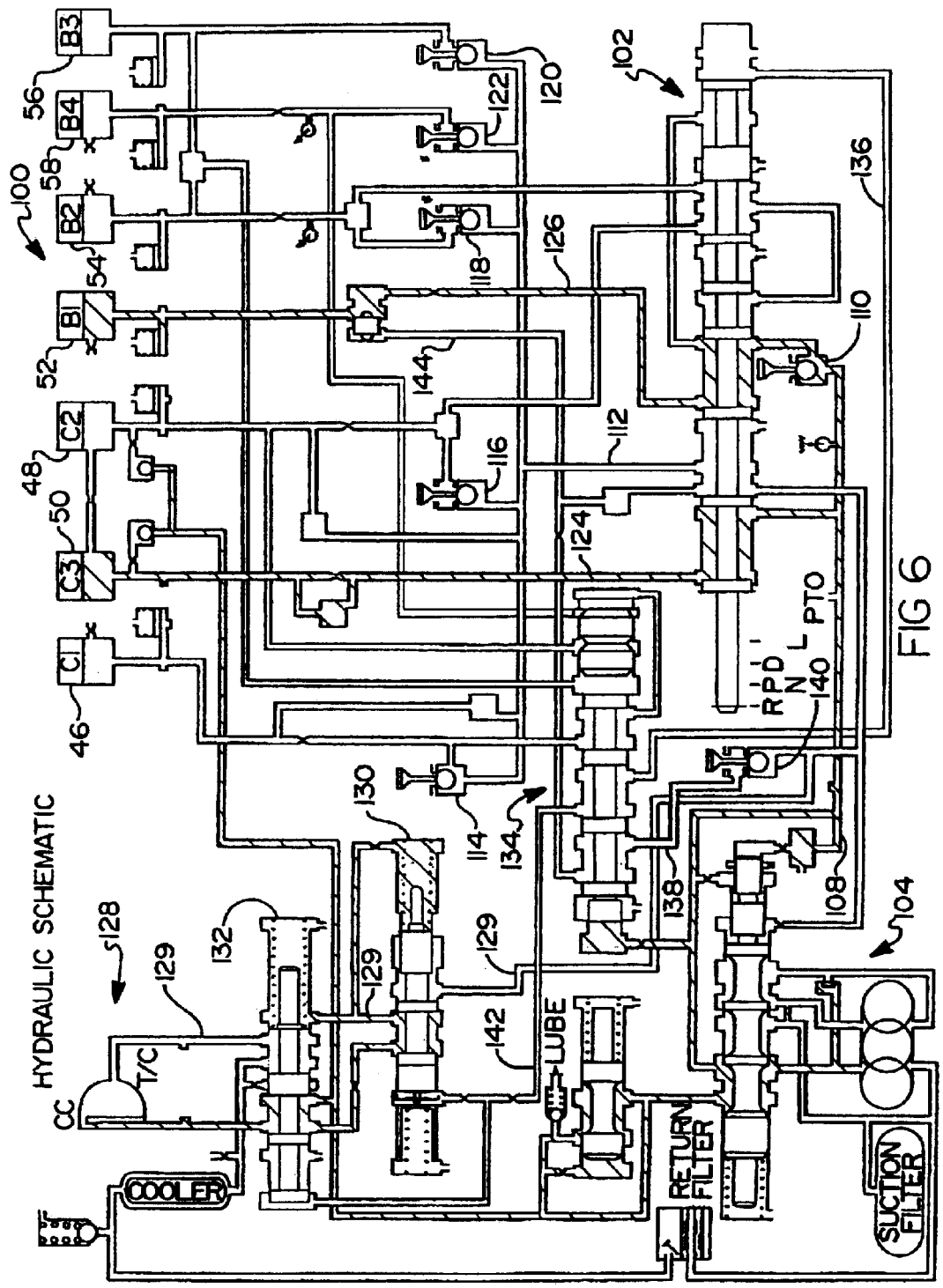
FIG. 6 is a schematic view of a hydraulic control system for an eight-speed automatic transmission in the reverse position according to the principles of the present invention.

Referring now to FIG. 6, when the manual valve 102 is in the reverse position, fluid flows from the pressurized fluid source 104 through the first fluid passage 108 and into the manual valve 102. Fluid is then directed within the manual valve 102 through fluid passage 124 to the third clutch 50. Fluid also flows through the manual valve through fluid passage 126 to the first brake 52 when the multiselect solenoid valve 110 is de-energized in its open position. In this way, as shown in FIG. 2, the third clutch 50 may be actuated with the first brake 52 to achieve reverse gear settings.

When electrical power is cut-off to the hydraulic control system 100, solenoid valves 110, 114, 116, 118, 120, 122, and 140 revert to their de-energized states. When the manual valve 102 is in the drive position and electrical power is cut-off to the hydraulic control system 100, fluid flow is automatically established from the pressurized fluid source 104 to the first clutch 46 via solenoid valve 114 and the second clutch 48 via solenoid valve 110, thereby providing a failsafe speed ratio, or default speed ratio, corresponding to fifth gear as shown in FIG. 2. When the manual valve 102 is in the manual/low position and electrical power is cut-off to the hydraulic control system 100, fluid flow is automatically established from the pressurized fluid source 104 to the first clutch 46 via solenoid valve 114 and the second brake 54 via solenoid valve 110, thereby providing a failsafe speed ratio, or default speed ratio, corresponding to second gear as shown in FIG. 2.

The above description of the invention is merely exemplary in nature and, thus, variations that do not depart from the general scheme of the invention are intended to be within the scope of the invention. Such variations are not to be regarded as a departure from the spirit and scope of the invention.

What is claimed is:

1. A hydraulic control system for an automatic transmission including a planetary gear system having a plurality of clutch elements and a plurality of brake elements engagable to alter a torque ratio of the automatic transmission, said hydraulic control system comprising:

a pressurized fluid source;

a manual valve selectively movable between a plurality of positions including reverse, drive, manual/low, and park/neutral, said manual valve communicating with said pressurized fluid source by a first fluid passage having a multiselect solenoid valve for selectively allowing fluid flow from said pressurized fluid source to said manual valve;

a second fluid passage communicating with said plurality of clutch elements, with said plurality of brake elements, and with said manual valve, said second fluid passage having a plurality of pulse-width solenoid valves disposed between said plurality of clutch elements and said manual valve, and between said plurality of brake elements and said manual valve, said plurality of pulse-width solenoid valves for selectively engaging said plurality of clutch elements and said plurality of brake elements;

a torque converter having an electronically modulated converter clutch, said torque converter in fluid communication with said pressurized fluid source through a third fluid passage;

a torque converter pressure valve disposed between said torque converter and said manual valve along said third fluid passage, said torque converter pressure valve capable of selectively closing said third fluid passage; and a switching valve in fluid communication with said manual valve through a fourth fluid passage and in fluid communication with said pressurized fluid source through a fifth fluid passage having a converter clutch solenoid valve disposed between said switching valve and said pressurized fluid source for selectively allowing fluid flow from said pressurized fluid source to said switching valve, said switching valve in fluid communication with said torque converter pressure valve through a sixth fluid passage;

wherein when said manual valve is in said park/neutral position, fluid from said pressurized fluid source flows through said first fluid passage to said manual valve when said multiselect solenoid valve is in an open position, through said manual valve, through said fourth fluid passage, through said switching valve, through said sixth fluid passage to said torque converter pressure valve, thereby opening said third fluid passage to said torque converter and activating said electronically modulated converter clutch; and wherein when said manual valve is in said drive and manual/low positions, fluid from said pressurized fluid source flows through said first fluid passage, through said manual valve, through said fifth fluid passage to said switching valve when said converter clutch solenoid valve is in an open position, through said switching valve, through said sixth fluid passage to said torque converter pressure valve, thereby opening said third fluid passage to said torque converter and activating said electronically modulated converter clutch.

2. The hydraulic control system of claim 1, wherein said multiselect solenoid valve regulates fluid pressure from said pressurized fluid source to said converter switching valve.

3. The hydraulic control system of claim 2, wherein when said manual valve is in said drive position, said converter clutch solenoid valve allows fluid communication to one of said plurality of brake elements.

4. A hydraulic control system for an automatic transmission including a planetary gear system having a plurality of clutch elements and a plurality of brake elements engagable to alter a torque ratio of the automatic transmission, said hydraulic control system comprising:

a pressurized fluid source;

a manual valve selectively movable between a plurality of positions including reverse, drive, manual/low, and park/neutral, said manual valve communicating with said pressurized fluid source by a first fluid passage having a multiselect solenoid valve for selectively allowing fluid flow from said pressurized fluid source to said manual valve;

a second fluid passage communicating with said plurality of clutch elements, with said plurality of brake elements, and with said manual valve, said second fluid passage having a plurality of pulse-width solenoid valves disposed between said plurality of clutch elements and said manual valve, and between said plurality of brake elements and said manual valve, said plurality of pulse-width solenoid valves for selectively engaging said plurality of clutch elements and said plurality of brake elements;

a torque converter having an electronically modulated converter clutch, said torque converter in fluid communication with said pressurized fluid source through a third fluid passage;

a torque converter pressure valve disposed between said torque converter and said manual valve along said third fluid passage, said torque converter pressure valve capable of selectively closing said third fluid passage;

a switching valve in fluid communication with said manual valve through a fourth fluid passage and in fluid communication with said pressurized fluid source through a fifth fluid passage having a converter clutch solenoid valve disposed between said switching valve and said pressurized fluid source for selectively allowing fluid flow from said pressurized fluid source to said switching valve, said switching valve in fluid communication with said torque converter pressure valve through a sixth fluid passage; and a power take-off unit in fluid communication with said third fluid passage;

wherein when said manual valve is in said park/neutral position, fluid from said pressurized fluid source flows through said first fluid passage to said manual valve when said multiselect solenoid valve is in an open position, through said manual valve, through said fourth fluid passage, through said switching valve, through said sixth fluid passage to said torque converter pressure valve, thereby opening said third fluid passage to said torque converter and activating said electronically modulated converter clutch, thereby providing electronically modulated converter clutch control to said power take-off unit.

* * * * *